United States Patent [19]

Schaffer

[11] Patent Number: 5,048,630
[45] Date of Patent: Sep. 17, 1991

[54] POWER STEERING TRIM CONTROL SYSTEM

[75] Inventor: David H. Schaffer, Chelsea, Mich.

[73] Assignee: Ford Motor Company, Dearborn, Mich.

[21] Appl. No.: 506,053

[22] Filed: Apr. 9, 1990

[51] Int. Cl.⁵ .............................................. B62D 5/08
[52] U.S. Cl. ..................................... 180/142; 60/468;
91/375 A; 91/437; 91/438; 91/467; 137/625.23;
137/625.24; 180/143; 180/149
[58] Field of Search ....................... 180/143, 149, 142;
91/375 A, 426, 437, 438, 467; 60/468;
137/625.23, 625.24

[56] References Cited

U.S. PATENT DOCUMENTS

| | | | |
|---|---|---|---|
| 4,063,490 | 12/1977 | Duffy | 91/467 |
| 4,434,866 | 3/1984 | Duffy | 180/143 |
| 4,516,471 | 5/1985 | Duffy | 91/375 A |
| 4,561,521 | 12/1985 | Duffy | 180/142 |
| 4,570,735 | 2/1986 | Duffy | 180/143 |
| 4,570,736 | 2/1986 | Waldorf | 180/143 |
| 4,828,067 | 5/1989 | Duffy | 180/143 |
| 4,926,956 | 5/1990 | Duffy | 180/143 |

Primary Examiner—Mitchell J. Hill
Attorney, Agent, or Firm—Frank G. McKenzie; Keith L. Zerschling

[57] ABSTRACT

A power steering trim control system for use with steering mechanisms provided in automotive vehicles. The trim system includes a flow distribution valve (38) which selectively directs fluid pressure to segregated groups (34, 36) of valve lands (32) of a rotary valve (24) in proportion to the deflection of a torsion bar (22). The valve lands (32) are angularly off-set from those found in the prior art in order to produce a desired biasing, or torque compensation. The torque which is manually transmitted is progressively supplemented by fluid pressure delivered to the pressure movable part (14) of a steering linkage (16). The invention also includes a process control circuit (60) which is provided with a vehicle speed sensor (60) for generating an electrical signal representative of vehicle speed. A torque sensor (64) in the circuit (60) continuously monitors the magnitude and direction of manual steering effort exerted by the driver and computes the average manual steering effort during successive time intervals. At the end of each interval, the control circuit (60) generates an energizing current in proportion to the magnitude and direction of the manual torque. This current proportionately displaces the flow distribution valve (38), which in turn selectively distributes the working fluid to the power steering unit (24). This process is repeated until the remaining amount of manual force required to maintain a straight-ahead driving configuration is the amount desired by the driver. This results in a minimal, or zero net torque condition, thereby avoiding driver fatigue in crosswind conditions, on cambered highways, or when a vehicle's tires have unequal driving characteristics.

20 Claims, 6 Drawing Sheets

Application Of Left Compensation

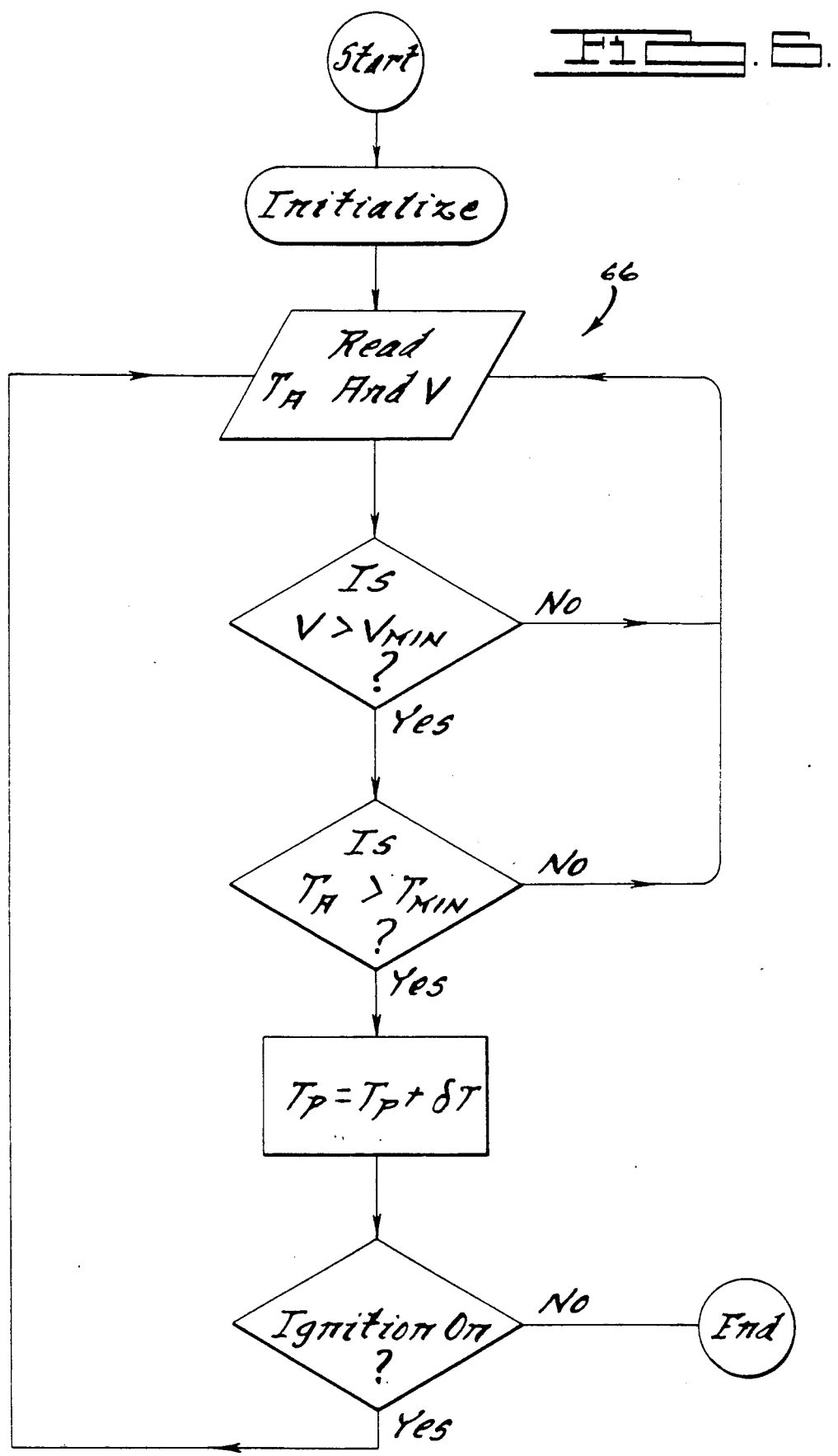

POWER STEERING TRIM CONTROL SYSTEM

TECHNICAL FIELD

The present invention relates generally to improvements in power steering mechanisms for automotive vehicles. More particularly, the present invention relates to an apparatus and method for trimming out manual forces required of a vehicle operator when a crosswind is encountered, when a road is cambered, or when the wheels are not aligned.

BACKGROUND ART

Conventional steering systems are now replete with power-assisted mechanisms in which auxiliary power sources assist a driver by contributing to the force required to direct dirigible road wheels. Power-assisted systems typically include a power steering cylinder which cooperates with a piston to define a pair of opposed working chambers. The steering system shown in U.S. Pat. No. 4,063,490 dated Dec. 20, 1977, which is assigned to the assignee of this invention, is illustrative and is incorporated by reference. As disclosed therein, the piston is carried on a piston rod that is joined to or is integral with a gear rack, which engages a pinion. A rotary valve mechanism is used to control the distribution of pressure to the working chambers to provide a powered assist to the manual steering effort applied to the pinion through a steering wheel. Located in a power steering valve housing, the rotary valve structure includes a valve sleeve having internal valve lands and an internal rotary valve spool having external valve lands that register with the internal valve lands. The spool is connected to a driver-controlled input shaft. Linking the input shaft and the pinion is a torsion bar which deflects in response to the magnitude and direction of torque applied to the steering wheel. The valve sleeve is joined to the pinion for common rotary movement. When such movement occurs, the external lands of the valve spool are displaced relative to the internal lands of the valve sleeve. This displacement controls distribution of pressurized fluid which is ducted to the valve sleeve through passages, thence to a working chamber of the power steering cylinder. The magnitude of the pressure differential across the fluid piston is determined by the magnitude of the torque which, in turn, determines the relative position of the internal and external valve lands.

The pumps used in such power steering systems are generally positive displacement pumps that deliver a constant flow through the rotary power steering valve. The valve lands of the spool and the sleeve are arranged so that flow occurs when the valve lands are positioned in a centered relationship. This is known as an open-center valve system that distributes pressure to the left turn working chamber or the right turn working chamber and gradually closes the return flow path into the fluid reservoir, depending on the magnitude and direction of the torque applied to the torque input shaft. Such systems are disclosed, for example, in U.S. Pat. No. 4,516,471, which is also assigned to the assignee of the present invention and is hereby incorporated by reference.

Driver preferences have evolved to the point where such steering systems should function without diminishing "road feel." "Good" road feel is a condition wherein a steering wheel self-centering force builds up gradually and smoothly from an off-center position in a safe, reassuring way. In such a condition, a vehicle displays good "directional sense" and "directional stability," yet the driver feels he is in command at all times. More road feel is obtained with more manual effort. Correspondingly, less road feel is transmitted to the driver with more power assist because high power gain resists road forces feeding back to the driver via the steering wheel.

If a given vehicle is difficult to steer manually in certain driving conditions, it requires more power assist. For example, the conventional vehicle is often harder to steer manually at low speeds, during cornering, and during parking. Power assist may then be available, but it should decrease with increasing vehicle speed.

To meet challenges posed by a firm, stable feel in steering systems at highway speeds while offering power assistance in low speed operations such as parking, the concept of speed-sensitive power steering has evolved in various forms. Such systems provide a firm stable "steering feel" with high driver steering efforts at high speeds, and a significant easing of manual effort as vehicle speed decreases. Speed-sensitive and variable assist power steering systems are disclosed, for example, in U.S. Pat. Nos. 4,434,866; 4,561,521; and 4,570,736, each also being assigned to the assignee of this invention.

Nevertheless, even these speed-sensitive power steering systems leave unsatisfied the preferences of today's discerning driver for compensation of pull and drift which arise when a crosswind is encountered, when the road is cambered, when the front tires have unequal driving characteristics, or when the front wheels are misaligned. On a long highway trip, a constant steering wheel pull that is required to keep the vehicle along a desired path is tiring and annoying. My invention makes it possible to avoid driver fatigue and irritation caused by a continuous pull exerted on the steering wheel. The invention enables the effort required of a driver to keep the vehicle along a desired path to be partly or completely trimmed out. Such a feature reduces the amount of manual effort required to be exerted over time. Additionally, my invention provides an improvement embodying these features which is adaptable for use with conventional power steering, as well as with variable assist systems.

Since individual driver preferences vary widely, it would be desirable to accommodate such preferences by providing a compensation feature in power steering systems which would maintain a residual amount of force required of the driver to maintain the vehicle's path in the desired direction.

Because good "feel" for corrective steering is a matter of subjective taste, it would be useful to provide a manual override to an automated power steering trim or compensation system so that the driver can adjust the desired amount of manual effort he or she prefers to apply to the steering wheel in order to maintain the vehicle along the desired path.

Additionally, an optimal compensation system would progressively offset the amount of manual effort exerted on the steering wheel over time, so as to make force diminution barely perceptible to the driver and introduce no sudden changes.

DISCLOSURE OF THE INVENTION

The present invention solves the above problems and addresses these needs by providing a trim system for power steering mechanisms. According to a feature of this invention, manual steering forces required at higher vehicle speeds are trimmed out in crosswind conditions, on cambered highways, where tires have unequal driving characteristics, or where the vehicle's front end is not aligned properly.

In vehicular systems that include the invention, there is provided a fluid pressure-operated power steering mechanism with a fluid flow source, a pressure movable part coupled to a steering linkage, a drive member connected to the pressure movable part, and a driving shaft linked to the drive member by a torsion member. The torsion member accommodates angular displacement of the drive member relative to the driving shaft. A rotary valve is situated in and partly defines pressure distribution and flow return passages extending to the pressure movable part and to the fluid flow source. The valve includes an internal valve member with a surrounding sleeve. The internal valve is connected to, and is rotatable with the driving shaft. External valve lands are provided on the internal valve member. The surrounding sleeve is connected to the drive member and includes internal valve lands which are registerable with the external valve lands of the internal valve member. Together, the internal and external valve lands cooperate to control pressure distribution to each side of the pressure movable part in response to the magnitude and direction of deflection of the torsion member.

The internal and external valve lands include a first group of valve lands for operation when torque is manually applied to the driving member in a first direction (to the right, for example). For operation when torque is manually applied in an opposing direction, a second group of valve lands is provided. An actuator, or flow-dividing valve selectively distributes fluid from the fluid flow source to the groups of valve lands. The valve lands are angularly off-set from those found in the prior art in order to produce a desired biasing, or torque compensation so that torque which is manually applied is progressively replaced over time by corresponding increases in pressure delivered to one side of the pressure movable part by the rotary valve.

The invention also includes a process control circuit which is provided with a vehicle speed sensor for generating an electrical signal representative of vehicle speed. The control circuit is effective when the vehicle travels in excess of intermediate speeds with the steering wheel close to a straight-ahead position. A torque sensor in the circuit continuously monitors the magnitude and direction of manual steering effort exerted by the driver and computes the average manual steering effort during successive time intervals. At the end of each interval, the control circuit generates an energizing current in proportion to the magnitude and direction of the manual torque. This current proportionately displaces the actuator or flow-dividing valve, which in turn regulates the flow of the working fluid to the power steering unit. This process is repeated until the amount of manual force required to maintain a straight-ahead driving configuration equals the amount desired by the driver.

The objects, features, and advantages of the present invention are readily apparent from the following detailed description of the best mode for carrying out the invention when taken in connection with the accompanying drawings.

BRIEF DESCRIPTION OF THE FIGURES OF THE DRAWINGS

FIG. 6 is a logic flow schematic which illustrates the main control steps of the power steering trim control process disclosed by my invention.

BEST MODES FOR CARRYING OUT THE INVENTION

Figure 1:
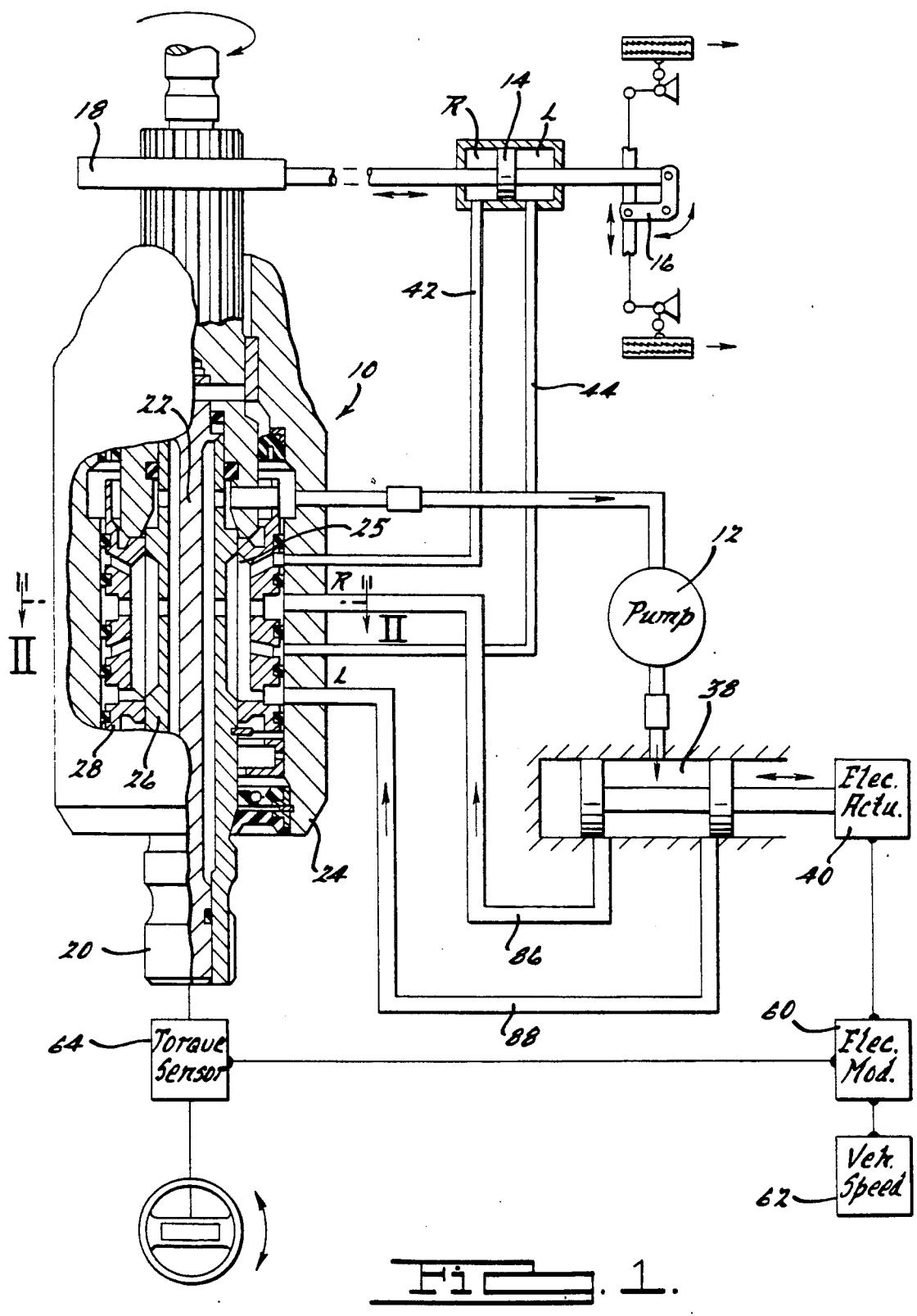
FIG. 1 is a cross-sectional schematic, partially fragmented view of a power steering trim control system embodying the improved steering trim control system of my invention.
Figure 2:
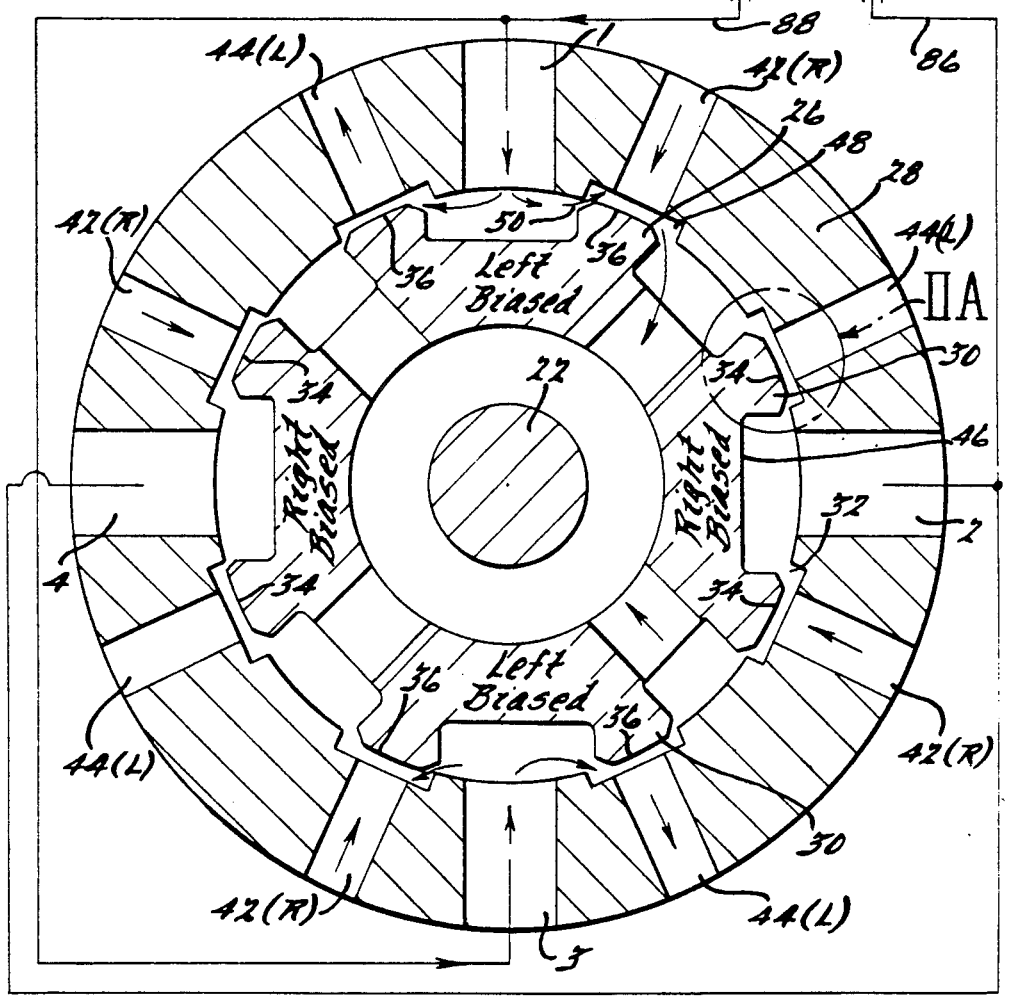
FIG. 2 is a cross-sectional view of the trim control system as seen from the plane of section line II—II of FIG. 1. A valve portion shown in FIG. 2 is in a position corresponding to the application of left, or counter-clockwise compensation. Included in FIG. 2A is an enlarged portion of a right turn port which illustrates a bias in valve lands, as taught by my invention.

Turning first to FIGS. 1 and 2 taken together, there is depicted a fluid pressure-operated power steering mechanism 10 as part of a vehicle with a fluid pressure source, or pump 12. The pump 12 is a positive displacement pump which delivers a constant flow. In such power steering mechanisms, there typically is found a pressure movable part 14 which is adapted to be connected to a steering linkage 16. Connected in turn to the pressure movable part 14 is a drive member 18 and a driving shaft 20 linked therewith through a torsion bar 22 which accommodates angular displacement of the drive member 18 relative to the driving shaft 20. Extending to the pressure movable part 14 are pressure distribution and flow return passages 25, 42, 44 which are partly defined by rotary valve means 24. The pressure distribution and flow return passages coordinate the communication of pressure differential forces acting on the pressure movable part 14.

In FIG. 1, there is illustrated for example chambers designated by the letters L (left) and R (right) which lie on opposite sides of the pressure movable part 14. If the pressure differential across the pressure movable part 14 is such that there is a higher pressure in the R than in the L chamber, then the pressure movable part is displaced so that the dirigible wheels tend to turn the vehicle to the right. On the other hand, if the fluid pressure delivered to the L side of the pressure movable part 14 exceeds that found in the R chamber, then the pressure movable part 14 produces a left turn tendency.

The present invention discloses a power steering trim control system which delivers a power-assisted supplement to torque which is manually applied by a driver to the steering wheel. To explain in detail how the present invention operates, it will first be necessary to set forth further detail of the rotary valve means 24.

Together, an internal valve member 26 and a surrounding sleeve 28 comprise the rotary valve means 24. The internal valve member 26 is connected to and is rotatable with the driving shaft 20, while the surrounding sleeve 28 is connected to and is rotatable with the drive member 18. Disposed circumferentially around the internal valve member 26 are external valve lands, one of which being depicted in enlarged form by the reference numeral 30 in FIG. 2A. In a facing relationship with the external valve lands 30, internal valve lands 32 are provided within the surrounding sleeve 28. As is best illustrated in FIG. 2, the internal valve lands 32 are registerable with the external valve lands 30. Acting in concert, the internal and external valve lands 30, 32 cooperate to control pressure distribution to the pressure movable part 14 in a manner which will be discussed in further detail below.

The internal and external valve lands, 30, 32 comprise a first group 34 of valve lands which operate when torque is manually applied to the driving shaft 20 in a first direction (to the right, or clockwise, for example). Correspondingly, a second group 36 of valve lands operate when torque is manually applied in an opposing direction (to the left, or counterclockwise).

Returning to FIG. 1, an actuator valve means 38 lies in communication with the fluid pressure source 12, which selectively directs fluid pressure to the groups 34, 36 of valve lands in response to the deflection of the torsion bar 22 above a given vehicle speed. Fluid pressure is selectively directed so that the torque which is manually applied at the steering wheel is progressively supplemented by fluid pressure delivered to the pressure movable part 14 by the rotary valve means 24. In this manner, the manually applied torque which is required to maintain the vehicle along a desired path is alleviated.

Upon inspection of FIGS. 1 and 2 it can be seen that the actuator valve 38 is akin to a spool valve including a pair of connected pistons. Their displacement within the actuator valve means 38 is such that incoming flow is never interrupted. There are two outlets 86, 88 which lead away from the actuator valve 38. At no point in the displacement of the spool valve are both outlets 86, 88 completely open. When one outlet is completely open, the other is closed, and visa versa.

Continuing with primary reference to FIG. 1, reference numeral 64 represents a torque sensor attached to the driving shaft 20 which is electrically connected to an electronic module 60 and to an electric actuator 40. When the torque sensor 64 senses the application of manually applied torque in the first direction, a signal is passed to the electric actuator 40 via the electronic module 60. This results in the spool valve 38 being displaced in the first direction, thereby opening one outlet, and closing the other. An opposite effect is produced when torque is manually applied in the opposing direction. The net result is that, over time, there is a pressure differential correction delivered to the rotary valve means 24 and ultimately to the pressure movable part 14.

As best illustrated in FIG. 1, the invention also includes vehicle speed responsive means 62 for directing fluid pressure to the groups 34, 36 of valve lands 30, 32 only when vehicle speed exceeds a predetermined value. This feature enables the driver to determine that the trim mechanism of the present invention shall only be operable above a predetermined speed. For example, he may wish to avail himself of the benefits of trimming only when the vehicle speed exceeds 40 miles per hour. In this case, only when driving at highway speeds in excessive of 40 miles per hour will manual torque be alleviated.

The pressure distribution passages, representatively depicted by the reference numeral 25, include separate passage portions for supplying pressure primarily to the first group 34 of valve lands when torque is manually applied in the first direction (to the right). Separate passage portions deliver pressure primarily to the second group 36 of valve lands when torque is manually applied in the second direction (to the left).

It will be appreciated that the first direction has consistently connoted thus far a direction to the right for exemplification. The first direction could also represent a left-oriented direction without departing from the spirit or scope of the present invention. Similar comments are applicable to the use thus far of the second direction.

With particular reference to FIGS. 1 and 2, it can be seen that the passages 25 include ports 1-4. As illustrated, for example, ports 1 and 3 supply fluid pressure to the second group 36 of valve lands. In the configuration of FIG. 2, fluid flows are depicted upon application of a torque compensation by the system to the left, or counterclockwise. Fluid entering port 1 may emerge to a second passage portion 44 with relative ease. In contrast, fluid passage across fluid metering portion 50 is inhibited by a constriction thereat.

Figure 2A:
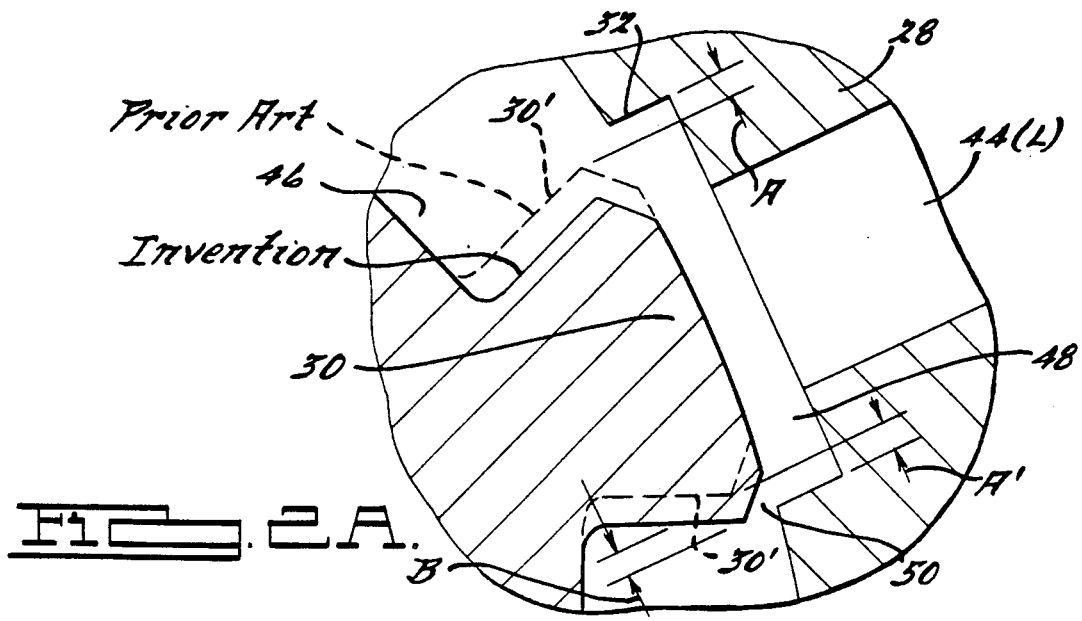

Turning now to the enlarged portion shown in FIG. 2A, there is illustrated detail of external and internal valve lands 30, 32. Shown in outline form is an external valve land configuration 30', which exemplifies prior art approaches. The present invention teaches a biasing, or off-setting, of the external valve lands 30 as illustrated. External valve lands as taught by the present invention are angularly off-set (B) from those found in the prior art. In practice, the dimension (B) may represent between about 0.001-0.004 inches. The displacement B exists even when there is zero net torque applied by the driver to the steering wheel. The biasing effect is also illustrated by dimensions (A, A'), which may typically result in off-sets of about 0.002-0.006 inches between facing internal and external valve lands.

Continuing with reference to FIG. 2, it will be appreciated that the first group 34 of valve lands include an off-set registration or bias in a clockwise direction. The second group 36 of valve lands are off-set in a counterclockwise direction in order to generate a left bias. It will readily be appreciated that similar fluid metering effects could readily be produced by suitable off-sets of the internal valve lands 32 in relation to the external valve lands 30.

Opposite port 1, incoming fluid can, because of the bias taught by the present invention, emerge more easily through the second passage portion 44 than through the fluid metering portion 50 and the first passage portion 42. Since the passage 44 is in communication with the left chamber of the pressure movable part 14, a power-assisted left turn tendency or compensation results.

The configuration depicted in FIG. 2 shows ports 1 and 3 delivering fluid pressure to counterclockwise-biased external valve lands, and ports 2 and 4 being capable of delivering fluid pressure to those valve lands having a clockwise bias. With such a configuration, there results an adequate balancing of associated hydrodynamic pressures across the plane II—II of FIG. 1. It will be readily appreciated, however, that alternative configurations of ports are possible. For example, ports 1 and 2 could be engineered so as to deliver fluid to valve lands having a clockwise bias and ports 3 and 4 could be so configured as to deliver fluid pressure to those lands having a counterclockwise bias.

The invention includes an actuator, or electro-mechanical means 40 for progressively redistributing fluid flow. Consider a condition in which a driver is required to apply a torque to the right in order to maintain his vehicle in a desired direction. In this example, fluid flow is delivered by actuator valve means 38 primarily along pressure distribution passages 86 associated with the first group 34 of valve lands. A reduced fluid flow is delivered along pressure distribution passages 88 associated with the second group 36 of valve lands. The result is that a reduced net torque condition is achieved, thereby avoiding driver fatigue.

When torque is manually applied in a second direction (to the left), the actuator 40 delivers fluid primarily to the second group 36 of valve lands. Fluid metering portions 50 then reduce fluid flow along passages 86 associated with the first group 34 of valve lands, thereby attaining a reduced net torque condition.

In practice, it may be desirable to leave a small, but positive amount of reduced net torque. Driver preferences, however, vary. The invention also comprehends driver-programmable means for adjusting the desired residual net torque condition, including a zero net torque condition. Such means include a control apparatus which receives input from the driver, the input being processed and transmitted to mechanical or electro-mechanical means 40 for directing fluid pressure.

There has thus far been described an embodiment of the present invention in combination with power-assisted steering mechanisms. There will now be described an alternate embodiment of the present invention as used in combination with variable-assist power steering systems (VAPS). In such systems, the amount of power assist which is available to the driver is a function of vehicle speed. Typically, such systems deliver more power assist at low vehicle speeds than at high vehicle speeds, thereby enhancing "road feel" in a manner which is now well known.

Figure 3:
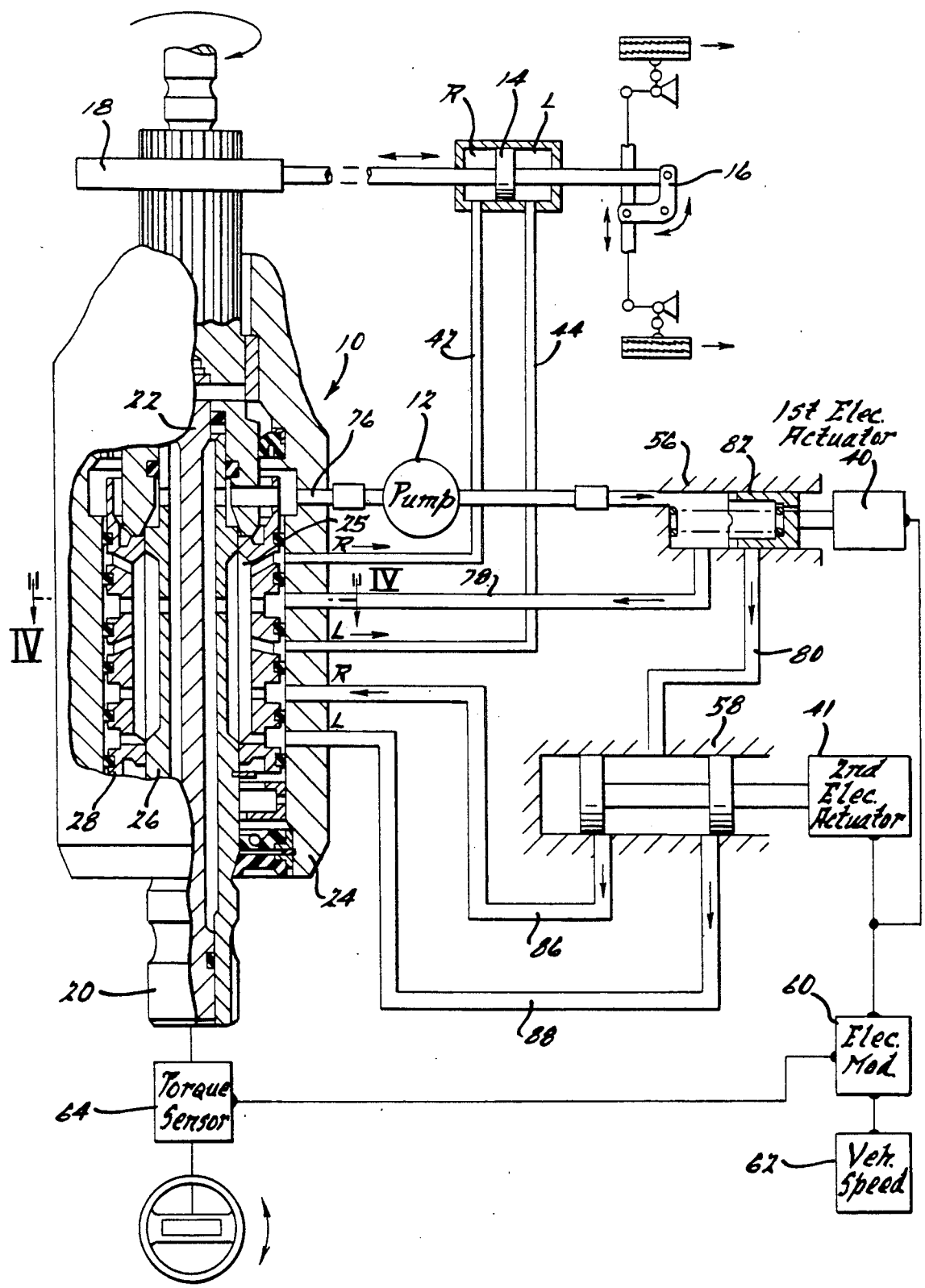
FIG. 3 is a cross-sectional schematic, partially fragmented view of a second embodiment of the power steering trim control system according to my invention, including a variable-assist power steering system.

FIG. 3 illustrates a variable-assist power steering system incorporating the modifications of the present invention. In that figure, a first vehicle speed sensitive actuator valve means 56 is connected to the fluid pressure source 12. Ducting away from the first vehicle speed sensitive actuator valve means 56 is a passage 78 which leads to the rotary valve means 24. Another passage 80 is capable of ducting fluid to the second vehicle speed sensitive actuator valve means 58, depending on the position in the actuator valve 56 of a piston 82 in relation to the passages 78, 80.

In combination with variable-assist power steering systems presently in use, there typically are four valve segments of the rotary valve 24. Conventionally, two segments are used for high manual effort required at high speeds, while all four are used for parking. The invention contemplates bifurcating the two high effort segments of the rotary valve 24 into two separate hydraulic circuits. One is biased in a first direction (clockwise, or right), and the other is biased in a second direction (counterclockwise, or left) in a manner which will be described in further detail.

As illustrated in FIG. 3, an additional second vehicle speed sensitive actuator valve 58 and second electronic actuator 41, such as a stepper motor or linear solenoid, cooperate to restrict, but not completely block, fluid flow to one emerging passage 86 or the other 88.

Figure 4:
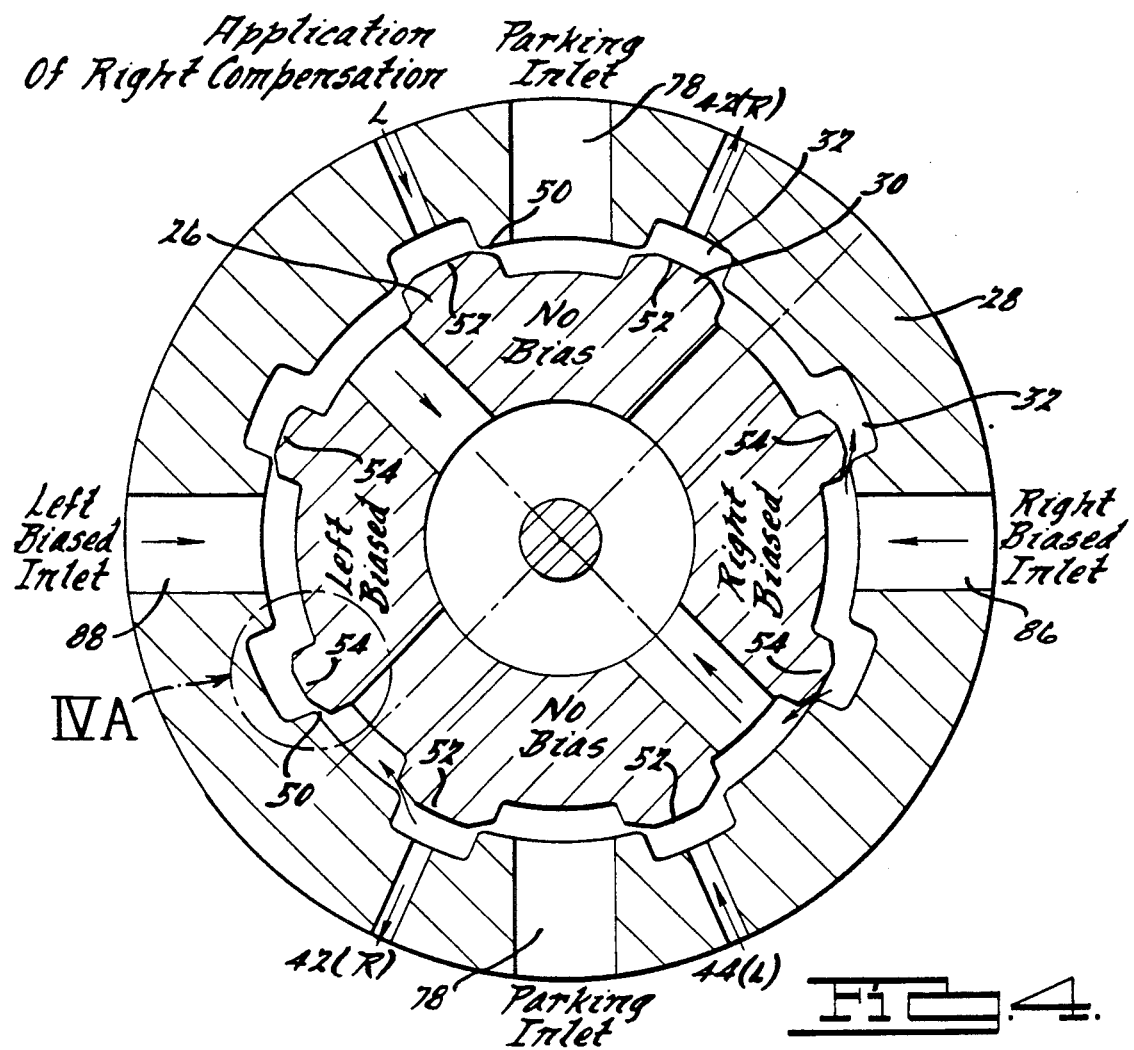
FIG. 4 is a cross-sectional view of the trim control system as seen from the plane of section line IV—IV of FIG. 3. A valve portion shown in FIG. 4 is in a position corresponding to the application of right, or clockwise compensation. Included in FIG. 4A is an enlarged portion of a left turn port which further illustrates the bias in valve lands.
Figure 4A:
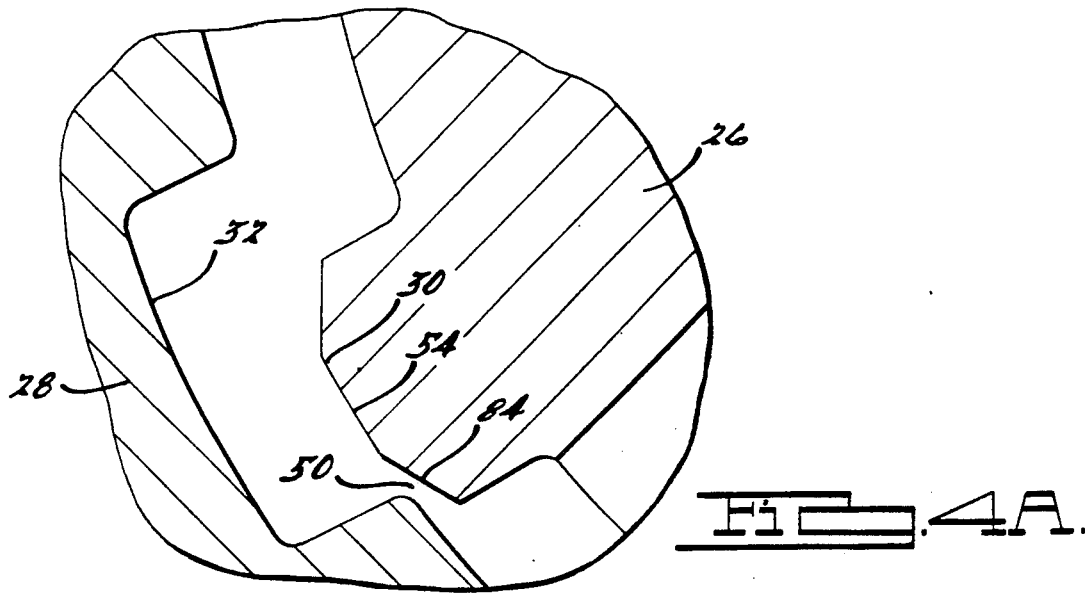

Turning now to FIG. 4, it can be seen that left and right biased inlets respectively replace the two high speed inlets which are embodied in conventional variable-assist power steering valves. The parking (low speed) inlets remain unaffected, as do the passages marked L and R which respectively lead ultimately to one side or the other of the pressure movable part 14. In this embodiment, a first set 52 of valve lands are used at low vehicle speeds. FIG. 4 illustrates that the first set 52 of lands lie adjacent to the parking inlets. It will be appreciated that "parking" includes low vehicle speeds generally.

A second set 54 of valve lands is used primarily at high vehicle speeds. The second set 54 of valve lands lie adjacent to the right and left biased inlets. The sets 52, 54 of valve lands cooperate to control flow distribution to the pressure movable part 14.

Turning now to FIGS. 3 and 4 taken together, it will be apparent that the first vehicle speed sensitive actuator valve means 56 is in communication with the fluid pressure source 12. The actuator valve 56 distributes fluid flow to the first set 52 of valve lands at low vehicle speeds via passage 78. The second vehicle speed sensitive actuator valve means 58 is in communication with the first actuator valve 56 via passage 80. At high vehicle speeds, the first actuator valve 56 distributes some fluid to the first set of valve lands, with more fluid pressure being delivered to the second actuator valve 58. It will be appreciated that the piston 82 shown in FIG. 3 is so located within the first vehicle speed sensitive actuator valve means 56 as to eliminate fluid flow to the second vehicle speed sensitive actuator valve 58, when the vehicle is travelling at low speed. As vehicle speed increases, piston 82 progressively moves within the actuator valve 56 so as to open passage 80 gradually, thereby delivering fluid to the second actuator valve 58 and thence to the right or left biased inlets via passages 86, 88.

This embodiment may also include vehicle speed responsive means 62 such as a speed sensor for activating the trimming feature only when vehicle speed exceeds a predetermined value. To accomplish this, the vehicle speed responsive means 62 cooperates with an electronic module 60, the electronic actuators 40, 41, and the second vehicle speed sensitive actuator valve means 58.

It will be appreciated that the fluid metering portions 50 may be defined by a bias, such as the dimension B in FIG. 2A, or by a beveled or chamfered edge 84, or by a combination of both.

Figure 5:
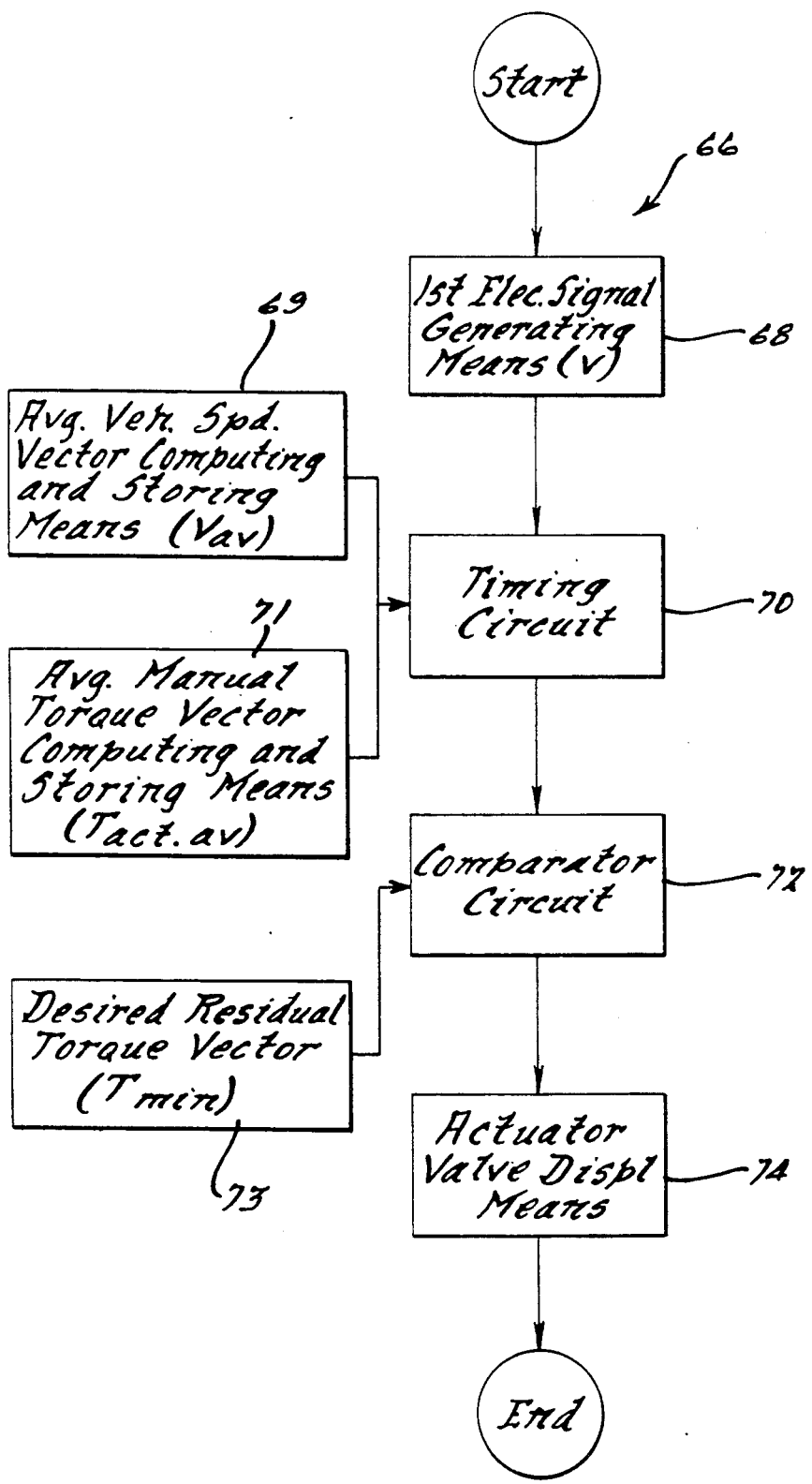
FIG. 5 is a block diagram illustrating the process steps involved in implementing the power steering trim control system of my invention.

Turning now to FIGS. 5 and 6, it will be appreciated that the present invention comprehends electro-mechanical means 66 for measuring, storing, and progressively diminishing over time torque applied manually ($T_{act}$) in either a first or a second direction, and replacing the diminution by corresponding increases ($\delta T$) in pressure delivered to the pressure movable part 14 by the rotary valve 24. The electro-mechanical means 66 comprises means for generating a first electrical signal 68 representing a vehicle speed vector (V). In practice, the first electrical signal generating means 68 includes the speed sensor 62 and electronic module 60 of FIGS. 1 and 3.

A timing circuit 70 is in communication with the first electrical signal generating means 68. The timing circuit 70 includes means 69, 71 for computing and storing over a first time increment ($\delta t$), a mean value of the vehicle speed vector ($V_{av}$), and a mean value of the manual torque vector ($T_{act.av}$). In practice, the first time increment ($\delta T$) should be large enough (for example, about 30 seconds) to produce a representative sampling period for observing the manually applied torque ($T_{act}$)

In communication with the timing circuit 70 is a comparator circuit 72. The comparator circuit 72 compares the mean manual torque vector ($T_{act.av}$), with the desired residual torque vector 73 ($T_{min}$) and generates a second electrical signal which is proportionate to the result of the comparison if the mean manual torque vector ($T_{act.av}$) exceeds the desired residual torque vector ($T_{min}$).

There is provided in communication with the comparator circuit 72 means for displacing 74 the actuator valve 58 proportionately in response to the second electrical signal. The actuator valve displacing means 74 distributes fluid pressure so that the manual torque ($T_{act}$) is proportionately supplemented by fluid pressure ($\delta T$) delivered to the pressure movable part 14 by the rotary valve 24. In this way, the manual torque ($T_{act}$) which is required to maintain the vehicle along the desired path is alleviated.

The invention contemplates that over a sampling period of, for example 30 seconds, between about 30 and 60 observations are made of vehicle speed (V) and manually applied torque ($T_{act}$) A suitable frequency of observations over a sampling period of about 30 seconds will produce increments in a stepper motor or solenoid-type device 41 associated with actuator valve 58 which are large enough to be effective, yet small enough to be barely perceptible to the driver. In practice, it is contemplated that the torque changes ($\delta T$) may be of the order of about 0.5 inch pounds. Such changes are reviewed and revised continuously about every 30 seconds while the vehicle's ignition system is activated.

It is anticipated that the invention disclosed herein will be operable only when deflections of the driving shaft 20 are up to about 10-15 degrees. When the steering wheel is rotated more than this amount, it is contemplated that the trim system disclosed herein would be deactivated by the appropriate control circuits.

Returning now to FIGS. 2 and 4 taken together, it will be apparent that the total number of pairs of valve lands equals 4. The minimum number of pairs of external lands is 2. It should be understood that a greater number of pairs of lands is possible, such as 8.

Thus, there has been disclosed alternative embodiments of an improvement to a conventional power-assisted steering system. The improvement gradually trims out, or compensates for, the amount of manual effort which is required of a driver to keep a vehicle along a desired path. The result is that driver fatigue is avoided, comfort is enhanced, and the increasing sophistication of driver preference is satisfied. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the following claims:

I claim:

1. In a fluid pressure-operated power steering gear mechanism of a vehicle having a fluid pressure source, a pressure movable part adapted to be connected to a steering linkage, a drive member connected to the pressure movable part, and a driving shaft connected to the drive member;
   a torsion bar comprising a connection between the drive member and the driving shaft, said torsion bar accommodating angular displacement of the drive member relative to the driving shaft;
   rotary valve means situated in and partly defining pressure distribution and flow return passages extending to the pressure movable part and to the fluid pressure source to effect pressure differential forces acting on the pressure movable part, said rotary valve means comprising an internal valve member and a surrounding sleeve, said internal valve member being connected to and rotatable with the driving shaft, said internal valve member being provided with circumferentially disposed external valve lands, said surrounding sleeve being connected to and rotatable with the drive member, said surrounding sleeve being provided with internal valve lands which are registerable with said external valve lands of said internal valve member;
   said internal and external valve lands cooperating to control pressure distribution to the pressure movable part;
   said internal and external valve lands comprising a first group of valve lands for operation when torque is manually applied to the driving shaft in a first direction and a second group of valve lands for operation when torque is manually applied in an opposing direction; and
   actuator valve means in communication with the fluid pressure source for selectively and progressively directing fluid pressure to said internal and external valve lands so that the torque which is manually applied to maintain the vehicle along a desired path is continuously modified by fluid pressure delivered to the pressure movable part by said rotary valve means.

2. The combination of claim 1, further including vehicle speed responsive means for directing fluid pressure to said internal and external valve lands only when vehicle speed exceeds a predetermined value, said vehicle speed responsive means being in communication with said actuator valve means.

3. The combination of claim 1, wherein said pressure distribution passages include separate passage portions for supplying pressure primarily to said first group of valve lands when torque is manually applied in said first direction and primarily to said second group of valve lands when torque is manually applied in said opposing direction.

4. The combination of claim 3, wherein said external valve lands are defined by axially extending slots in said internal valve member and said internal valve lands of said surrounding sleeve are defined by axially extending grooves in said surrounding sleeve.

5. The combination of claim 4, wherein said pressure distribution passages communicate with said slots across fluid metering portions defined between said internal lands in said surrounding sleeve and said external lands in said internal valve member.

6. The combination of claim 5, wherein a plurality of said external valve lands are angularly displaced with respect to said internal valve lands when there is zero net torque acting upon said driving shaft, further including electro-mechanical means for progressively diminishing manually applied torque so that when torque is manually applied in said first direction, fluid pressure is delivered primarily along pressure distribution passages associated with said first group of valve lands and a reduced fluid pressure is delivered along pressure distribution passages associated with said second group of valve lands, thereby attaining a reduced net torque condition.

7. The combination of claim 5, wherein a plurality of aid external valve lands are angularly displaced with respect to said internal valve lands when there is zero net torque acting upon said driving shaft, further including electro-mechanical means for progressively diminishing manually applied torque so that when torque is manually applied in said opposing direction, fluid pressure is delivered primarily along pressure distribution passages associated with said second group of valve lands and a reduced fluid pressure is delivered along pressure distribution passages associated with said first group of valve lands, thereby attaining a reduced net torque condition.

8. The combination of claim 6, wherein said reduced net torque condition is a zero net torque condition.

9. The combination of claim 7, wherein said reduced net torque condition is a zero net torque condition.

10. In a fluid pressure-operated power steering gear mechanism of a vehicle having a fluid pressure source, a pressure movable part adapted to be connected to a steering linkage, a drive member connected to the pressure movable part, a driving shaft connected to the drive member, and a torsion bar comprising a connection between the drive member and the driving shaft, said torsion bar accommodating angular displacement of the drive member relative to the driving shaft, a power steering trim control system comprising:

rotary valve means situated in and partly defining pressure distribution and flow return passages extending to the pressure movable part and to the fluid pressure source to effect pressure differential forces acting on the pressure movable part, said rotary valve means comprising an internal valve member and a surrounding sleeve, said internal valve member being connected to and rotatable with the driving shaft, said internal valve member being provided with circumferentially disposed external valve lands, said surrounding sleeve being connected to and rotatable with the drive member, said surrounding sleeve being provided with internal valve lands which are registerable with said external valve lands of said internal valve member;

said internal and external valve lands cooperating to control pressure distribution to the pressure movable part in response to the magnitude and direction of deflection of said torsion bar and to vehicle speed;

said internal and external valve lands comprising a first group of valve lands for operation when torque is manually applied to the driving member in a first direction and a second group of valve lands for operation when torque is manually applied in an opposing direction, said groups including a first set of valve lands for use at low vehicle speeds and a said second set of valve lands for use at high vehicle speeds, said sets of valve lands co-operating to control pressure distribution to the pressure movable part upon deflection of the torsion bar;

first vehicle speed-sensitive actuator valve means in communication with the fluid pressure source for distributing fluid pressure to said first set of valve lands at low vehicle speeds; and second vehicle speed-sensitive actuator valve means in communication with said first actuator valve means, said first actuator valve means distributing fluid pressure at high vehicle speeds to said first set of valve lands and to said second actuator valve means, said second actuator valve means selectively and progressively distributing fluid pressure to said second of set of valve lands over time, said second set of valve lands cooperating to control pressure distribution to the pressure movable part gradually upon deflection of the torsion bar, so that the torque which is manually applied to maintain the vehicle along a desired path is continuously modified by fluid pressure delivered to the pressure movable part by said rotary valve means.

11. The combination of claim 10, further including vehicle speed responsive means for directing fluid pressure to said groups of valve lands only when vehicle speed exceeds a predetermined value, said vehicle speed responsive means being in communication with said actuator valve means.

12. The combination of claim 11, wherein said passages include separate passage portions for supplying pressure primarily to said first group of valve lands when torque is manually applied in said first direction and primarily to said second group of valve lands when torque is manually applied in said second direction.

13. The combination of claim 12, wherein said external valve lands are defined by axially extending slots in said internal valve member and said internal valve lands of said surrounding sleeve are defined by axially extending grooves in said surrounding sleeve.

14. The combination of claim 13, wherein said pressure distribution passages communicate with said slots across fluid metering portions defined between said internal lands in said surrounding sleeve and said external lands in said internal valve member.

15. The combination of claim 14, wherein a plurality of said external valve lands are angularly displaced with respect to said internal valve lands when there is zero net torque acting upon said driving shaft, further including electro-mechanical means for progressively diminishing manually applied torque so that when torque is manually applied in said first direction, fluid pressure is delivered primarily along pressure distribution passages associated with said first group of valve lands and a reduced fluid pressure is delivered along pressure distribution passages associated with said second group of valve lands, thereby attaining a reduced net torque condition.

16. The combination of claim 14, wherein a plurality of said external valve lands are angularly displaced with respect to said internal valve lands when there is zero net torque acting upon said driving shaft, further including electro-mechanical means for progressively diminishing manually applied torque so that when torque is manually applied in said second direction, fluid pressure is delivered primarily along pressure distribution passages associated with said second group of valve lands and a reduced fluid pressure is delivered along pressure distribution passages associated with said first group of valve lands, thereby attaining a reduced net torque condition 17. The combination of claim 15, wherein said reduced net torque condition is a zero net torque condition.

18. The combination of claim 16, wherein said reduced net torque condition is a zero net torque condition.

19. In a fluid pressure-operated power steering gear mechanism of a vehicle having fluid pressure source, a pressure movable part adapted to be connected to a steering linkage, a torsion bar connecting a drive member and a driving shaft, rotary valve means situated in and partly defining pressure distribution and flow return passages extending to the pressure movable part and to the fluid pressure source, and an actuator valve in communication with the fluid pressure source for directing fluid pressure;

electro-mechanical means for measuring, storing, and progressively modifying torque applied manually ($T_{act}$) in either a first or a second direction and applying corresponding changes ($\delta T$) in pressure to the pressure movable part by the rotary valve means, said electro-mechanical means comprising:

means for generating an first electrical signal representing a vehicle speed vector (V);

a timing circuit in communication with said first electrical signal generating means including means for computing and storing over a first time increment ($\delta t$) a means value of said vehicle speed vector ($V_{av}$) and a mean value of said manual torque vector ($T_{act.av}$);

a comparator circuit in communication with said timing circuit including means for storing a desired residual torque vector ($T_{min}$), comparing said mean manual torque vector ($T_{act.av}$) with said desired residual torque vector ($T_{min}$), and generating a second electrical signal proportionate to the result of the comparison if said mean manual torque vector ($T_{act.av}$) exceeds said desired residual torque vector ($T_{min}$); and means for displacing the actuator valve, in communication with said comparator circuit, proportionately in response to said second electrical signal so that said manual torque ($T_{act}$) is progressively modified by fluid pressure ($\delta T$) delivered to the pressure movable part by the rotary valve means, thereby alleviating said manual torque ($T_{act}$) which is required to maintain the vehicle along a desired path.

20. In a fluid pressure-operated power steering gear mechanism of a vehicle having a fluid pressure source, a pressure movable part adapted to be connected to a steering linkage, a drive member connected to the pressure movable part, and a driving shaft connected to the drive member;

a torsion bar comprising a connection between the drive member and the driving shaft, said torsion bar accommodating angular displacement of the drive member relative to the driving shaft;

rotary valve means situated in and partly defining pressure distribution and flow return passages extending to the pressure movable part and to the fluid pressure source to effect pressure differential forces acting on the pressure movable part, said rotary valve means comprising an internal valve member and a surrounding sleeve, said internal valve member being connected to and rotatable with the driving shaft, said internal valve member being provided with circumferentially disposed external valve lands, said surrounding sleeve being connected to and rotatable with the drive member, said surrounding sleeve being provided with internal valve lands which are registerable with said external valve lands of said internal valve member;

said internal and external valve lands cooperating to control pressure distribution to the pressure movable part;

said internal and external valve lands comprising a first group of valve lands for operation when torque is manually applied to the driving member in a first direction and a second group of valve lands for operation when torque is manually applied in an opposing direction, said groups including a plurality of sets of valve lands, said sets being selectively adaptable for use dependent on vehicle speed, said sets of valve lands cooperating to control pressure distribution to the pressure movable part upon deflection of the torsion bar; and at least one vehicle actuator valve means in communication with the fluid pressure source for selectively distributing fluid pressure to said sets of valve lands dependent on vehicle speed, said at least one actuator valve means for selectively and progressively distributing fluid pressure to said internal and external valve lands, said internal and external valve lands cooperating to control pressure distribution to the pressure movable part gradually upon deflection of the torsion bar, so that the torque which is manually applied to maintain the vehicle along a desired path is continuously modified by fluid pressure delivered to the pressure movable part by said rotary valve means.

* * * * *